USO10120941B2

(12) United States Patent
Andrews et al.

(10) Patent No.: US 10,120,941 B2
(45) Date of Patent: Nov. 6, 2018

(54) DYNAMIC RUNTIME ENVIRONMENT CONFIGURATION FOR QUERY APPLICATIONS

(71) Applicant: International Business Machines Corporation, Amonk, NY (US)

(72) Inventors: Robert D. Andrews, Rochester, MN (US); Robert J. Bestgen, Rochester, MN (US); Gene R. Cobb, Oronoco, MN (US); Kathryn R. Steinbrink, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 13/955,376

(22) Filed: Jul. 31, 2013

(65) Prior Publication Data
US 2015/0039649 A1 Feb. 5, 2015

(51) Int. Cl.
*G06F 17/30* (2006.01)
(52) U.S. Cl.
CPC .. *G06F 17/30867* (2013.01); *G06F 17/30864* (2013.01)
(58) Field of Classification Search
CPC ......... G06F 17/30029; G06F 17/30035; G06F 17/30699; G06F 17/30702; G06F 17/30761; G06F 17/30828; G06F 17/30867; G06F 17/30864
USPC ....................................... 707/770
See application file for complete search history.

(56) References Cited

U.S. PATENT DOCUMENTS

| 7,293,260 | B1* | 11/2007 | Dmitriev ..................... 717/130 |
| 7,401,324 | B1* | 7/2008 | Dmitriev ..................... 717/130 |
| 7,647,629 | B2 | 1/2010 | Brumme et al. |
| 2002/0147724 | A1 | 10/2002 | Fries et al. |
| 2003/0158842 | A1 | 8/2003 | Levy et al. |
| 2006/0112175 | A1* | 5/2006 | Sellers et al. ................. 709/223 |
| 2008/0086564 | A1 | 4/2008 | Putman et al. |
| 2008/0177756 | A1 | 7/2008 | Kosche et al. |
| 2009/0271762 | A1 | 10/2009 | Taylor et al. |

(Continued)

FOREIGN PATENT DOCUMENTS

WO    2012167113 A1    12/2012

OTHER PUBLICATIONS

IBM Patent Application entitled "Profile-Enabled Dynamic Runtime Environment For Web Application Servers," filed by Robert D. Andrews et al. on Jul. 31, 2013.

*Primary Examiner* — Hosain Alam
*Assistant Examiner* — Saba Ahmed
(74) *Attorney, Agent, or Firm* — Patterson + Sheridan, LLP

(57) ABSTRACT

Techniques are disclosed for allowing users to access data libraries associated with multiple, isolated runtime environments (RTEs). A web query application receives a query and determines an RTE to execute the query against. The web query application determines whether a current RTE matches the determined RTE. If the web query application determines that the current RTE does not match the determined RTE, the web query application configures a server computing system to access the determined RTE and execute the query against data libraries associated with the determined RTE. If the web query application determines that the current RTE matches the determined RTE, the web query application executes the query against the data libraries associated with the current RTE.

12 Claims, 8 Drawing Sheets

(56) References Cited

U.S. PATENT DOCUMENTS

| | | |
|---|---|---|
| 2009/0313601 A1 | 12/2009 | Baird et al. |
| 2012/0036508 A1 | 2/2012 | Johnson et al. |
| 2012/0310921 A1 | 12/2012 | Egan et al. |
| 2015/0095372 A1 | 4/2015 | Andrews et al. |
| 2015/0142849 A1 | 5/2015 | Andrews et al. |

* cited by examiner

| COUNTRY | REGION | STORE NAME | SEASON | YEAR 1 | YEAR 2 |
|---|---|---|---|---|---|
| CANADA | EASTERN CANADA | ABC | SPRING | 144 | 150 |
| | | | SUMMER | 200 | 100 |
| | | | FALL | 120 | 130 |
| | | | WINTER | 321 | 120 |
| UNITED STATES | EASTERN US | XYZ | SPRING | 144 | 128 |
| | | | SUMMER | 102 | 109 |
| | | | FALL | 120 | 130 |
| | | | WINTER | 321 | 331 |

FIG. 6

DYNAMIC RUNTIME ENVIRONMENT CONFIGURATION FOR QUERY APPLICATIONS

BACKGROUND

Field

Embodiments of the invention generally relate to techniques for accessing data in computing applications. More specifically, techniques are disclosed for switching runtime data environments.

Description of the Related Art

Business and government entities frequently have different data sets for different sectors of their business. That is, businesses often own multiple databases containing different sets of data (known as "data environments" or "libraries") that are similar in format, wherein each library is populated with a distinct set of data. Thus, the format of the data environment is similar in column and row structure, heading structure, and the like. However, these data environments may be isolated from one another such that a user who is currently accessing one data environment cannot easily switch to accessing another data environment.

Consider the following example: the Minnesota state government records data about traffic violations for each county in isolated libraries. Thus, a state employee for Olmsted County has access to the data environment for traffic violations in Olmsted County. However, if the state employee wishes to access traffic violation data for a different county, such as Ramsey County, the state employee cannot easily gain access to the Ramsey County library since the libraries are isolated. In order to access the Ramsey County library, the Olmsted County employee may have to take additional steps, such as logging out of the traffic violation software and logging back in as a Ramsey County employee, or requesting that a network administrator restart and reload the Olmsted county server with the data libraries for Ramsey County.

A similar problem occurs in multi-tenant applications. A multi-tenant application is a single running instance of a program with multiple users simultaneously using the program. Oftentimes, a multi-tenant application uses multiple servers in order to isolate one tenant's data from another. Thus, one tenant cannot access another tenant's data servers without reloading or restarting one or more of the servers or setting up multiple instances of the multi-tenant application.

Another example of isolated data sets occurs when a cloud service provider hosts data environments for several clients in a common data center. In this example, each client's data is hosted on a separate virtual machine. A virtual machine effectively divides the resources of one computer amongst many users by simulating hardware components. An entire server can be virtualized in this manner, allowing several clients to share the resources of a single server without the knowledge that other clients are also using the server. Oftentimes, a client will duplicate data environments on multiple virtual machines in order to ensure isolation.

A third example of isolated data environments occurs with web-based server applications. One instance of this is a business analytics tool that allows a user to execute queries on a runtime environment (RTE). Running a report involves, for example, accessing sales data stored in the database and generating a visual representation of that sales data, such as a spreadsheet or pie chart of sales numbers. For example, a business stores sales data for all the countries in which sales have been made in isolated environments, one environment for each country. In this example, an associate salesperson is limited to access for US sales data due to her associate status, but she is not be allowed access to sales data for Canada. The associate salesperson is then promoted to regional manager, and is thus granted access to all sales data worldwide. However, due to the isolated nature of the data environments for each country, the new regional manager cannot easily switch from running reports for US sales to running reports for Canadian sales. Thus, the regional manager may need to log out as a US salesperson and log in as a Canadian salesperson. Alternatively, the regional manager may need to request that the US sales data server is restarted and reloaded with Canadian data.

SUMMARY

Embodiments presented herein include a method returning data to a user. The method may generally include receiving a query. The method may also generally include determining a runtime environment (RTE) to execute the query against, in which the RTE is associated with data libraries. The method may also generally include determining whether a current RTE matches the determined RTE. If the method determines that the current RTE does not match the determined RTE, the method may generally include configuring a computer server system to access the determined RTE. The method may also generally include executing the query against the data libraries associated with the current RTE.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE SEVERAL VIEWS OF THE DRAWINGS

FIG. 6 illustrates an example interface showing a generated report of sales data.

DETAILED DESCRIPTION

Figure 1:
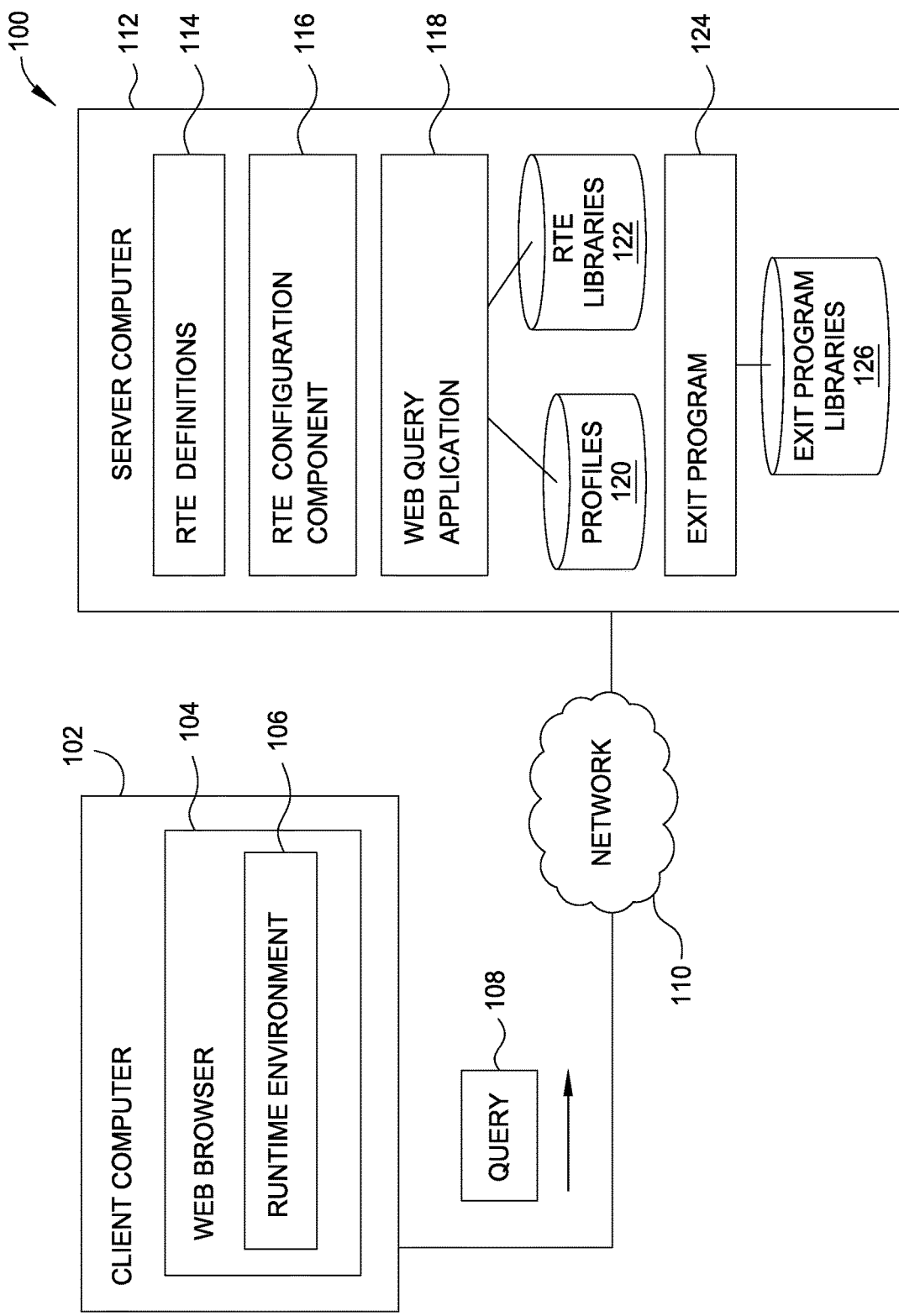
FIG. 1 illustrates an example computing infrastructure including a client and a server computer, according to one embodiment of the invention.

Embodiments presented herein provide techniques allowing users to access multiple runtime environments (RTEs) from a web browser hosted by a client device. An RTE, as used herein, includes a set of data libraries ("libraries"). The techniques disclosed herein allow users to access libraries contained in multiple, isolated RTEs through an application.

That is, a user with access to data libraries associated with a first RTE can access data libraries associated with a second RTE, without reloading the server containing the RTE, or logging in as a different user. One example of an application in which users may access libraries is a web query application. Further, in cases where the data libraries store different data in a common format, the same query tool (and queries) can run over either library. In one embodiment, as part of query execution, the web query application determines an RTE to use for each query submitted by a user interacting with a web client. Alternatively, the user specifies the correct RTE for the query sent by the user.

In one embodiment, a user profile identifies which RTEs a user is authorized to access. Consider a company which sells equipment around the globe. Assume the company maintains sales data for each country in which the company does business. In this example, a salesperson uses a web browser which hosts data libraries for the RTE associated with sales made in the US. However, the salesperson would like to access sales data for Canada. Further, assume the corresponding user profile authorizes the salesperson to access all RTEs associated with countries in North America. When the salesperson submits a query requesting Canadian sales data, the web application determines that the Canadian RTE needs to be accessed. In response, the computer server configures the data libraries accessed by the query to correspond to the Canadian RTE. The web query application returns Canadian sales data to the salesperson. Alternatively, the salesperson may actively select the Canadian RTE (from, e.g., a drop-down menu). In such a case, the query application (after validating the user's authority to access this RTE) executes a query against the Canadian RTE.

In one embodiment, the web query application determines which RTE to configure each time a user submits a query. If the user submits a query against an RTE that is currently configured, the web query application does not reconfigure a new RTE. Rather, the web query application executes the query against the libraries associated with the currently configured RTE. In contrast, if the user submits a query against an RTE that is not currently configured, the web query application executes the query as described above.

Embodiments presented herein provide techniques for allowing an administrator to assign profiles to RTEs. The techniques disclosed herein allow an administrator to associate a specific user profile with an RTE and/or associate a group profile with an RTE. A group profile may be associated with multiple users and an RTE. Continuing with the above example, assume the company employs both junior and senior salespeople. In this example, junior salespeople might access North America sales data. An administrator can create a "junior group profile" that allows junior salespeople to access RTEs associated with North American sales. Thus, the junior group profile would be associated with RTEs for Canada, the US and Mexico. In such a case, the web query application would limit access to any of the data libraries for Canada, the US and Mexico to members of the junior group profile.

Other embodiments presented herein provide techniques for allowing an administrator to manage and edit RTEs. The techniques allow an administrator to add, remove, change or copy RTEs associated with specific user profiles or group profiles. In addition, the properties of one or more RTEs may be edited by an administrator. Also, embodiments are described herein using a web query application as a reference example of an application configured to access a database system which dynamically configures a runtime environment on a per-query basis. Of course, embodiments of the invention may be adapted for a variety of applications programs configured to access database systems.

FIG. 1 illustrates an example computing infrastructure 100, including client computer 102 and server computer 104, according to one embodiment of the invention. The computing infrastructure 100 allows a user to execute a query (such as query 108) against multiple RTEs. As shown, client computer 102 hosts a web browser 104. Web browser 104 is configured to execute runtime environment 106. A user of client computer 102 sends a query 108 to server computer 112 through network 110. Server computer 112 may be a physical computing system (e.g., a system in a data center) or may be a virtual computing instance executing within a computing cloud. As shown, server computer 112 stores RTE definitions 114, RTE configuration component 116, and web query application 118. Server computer 112 also stores profiles 120 and libraries 122. RTE definitions 114 stores data about each RTE that may be exposed to a client interaction with a web query application. Each RTE may specify a group of data libraries that are associated with that RTE. As noted, each RTE may store data using a similar format or schema, but store different actual data. For example, an organization may include the same type of sales data for each region, using the same storage format. Thus a query application used to access data according to that format can access data from the RTE from any region. RTE configuration component 116 allows an administrator to edit RTE definitions 114 and profiles 120. This process is described in greater detail in the detailed description associated with FIGS. 4 and 5. Web query application 118 receives query 108 from client computer 102 and executes query 108 against a set of the libraries 122. RTE libraries 122 store data associated with each RTE in RTE definitions 114. In one embodiment, exit programs 124 may be called by web query application 118 in order to perform additional functions (e.g., modify user searches to become case insensitive searches, or track data from the data libraries accessed by the user). Exit programs 124 access data stored in exit program libraries 126.

In one embodiment, web query application 118 determines which RTE, and thus, which library 122, query 108 is executed against. Furthermore, web query application 118 determines the RTE by evaluating profiles 120. Alternatively, the user may identify an RTE when submitting query 108. In both cases, web query application 118 executes query 108 against the libraries 122 associated with the determined RTE.

Figure 2:
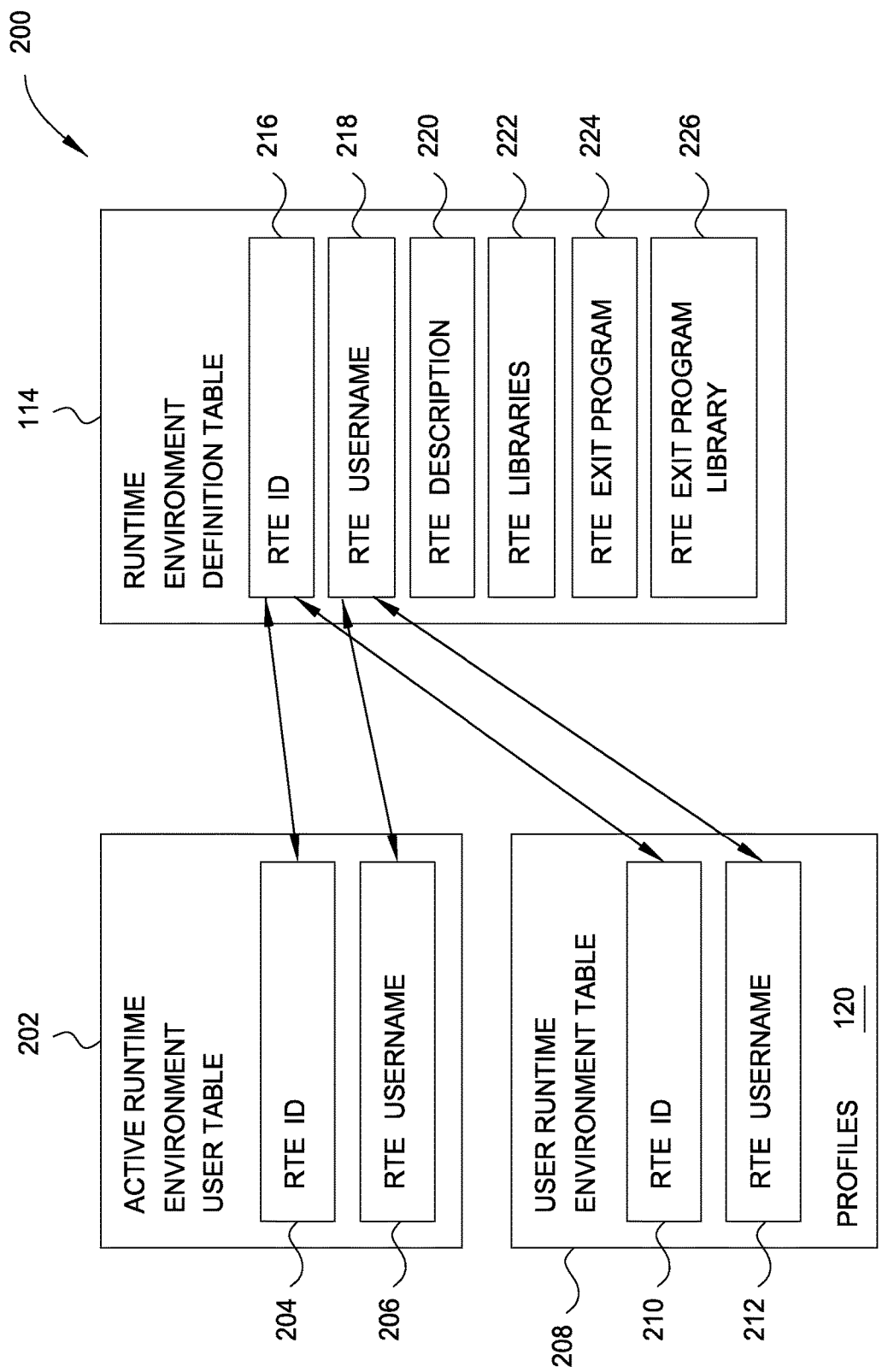
FIG. 2 illustrates an example embodiment of a web query application, according to one embodiment of the invention.

FIG. 2 illustrates an example of the web query application 118, according to one embodiment. As shown, web query application 118 accesses three "master tables," including active RTE user table 202, user RTE table 208, and RTE definition table 114. Active RTE user table 202 identifies RTEs defined for the server computer 112. In this example, active RTE user table 202 includes RTE ID 204 and RTE username 206. RTE username 206 is the name of a user with access to the currently configured RTE specified by RTE ID 204. The currently configured RTE may be the RTE currently running on client computer 102 (i.e., RTE 106).

User RTE table 208 associates users with specific RTEs. User RTE table 208 includes RTE ID 210 and RTE username 212. While user RTE table 208 is illustrated using one RTE ID and one RTE username, user RTE table 208 may of course store multiple RTE IDs 210 and RTE usernames 212.

RTE definition table 114 describes the runtime setup for each RTE available on server computer 112. In this example, RTE definition table 114 stores the following RTE definitions: RTE ID 216, RTE username 218, RTE description 220, and the location of RTE libraries 222. RTE definition table 114 stores one such set of RTE definitions for each RTE available on server computer 112.

In a further embodiment, RTE definition table 114 stores two additional RTE definitions: RTE exit programs 224 and RTE exit program libraries 226. RTE exit program 224 references exit programs 124 associated with RTE ID 216. Similarly, RTE exit program library 226 references RTE libraries 126 associated with RTE exit program 224.

In one embodiment, each time web query application 118 services a query made by a user (such as query 108), web query application 118 determines which libraries to execute query 108 against. More specifically, web query application 118 reads the active RTE user table 202 to identify a user profile associated with the query. That is, web query application 118 reads RTE username 206 to identify the user. Furthermore, web query application 118 determines whether query 108 references the currently configured RTE (i.e., whether query 108 references RTE ID 204). If query 108 references the currently configured RTE, the web query application 118 executes query 108 against the currently configured RTE (i.e., against the data libraries associated with RTE ID 204). That is, web query application 118 does not reconfigure the library associated with the currently configured RTE if query 108 references the currently configured RTE. Instead, the appropriate runtime definitions are already loaded, as indicated by the arrows between active RTE table 202 and RTE definition table 114. In one example, active RTE table 202 and RTE definition table 214 are relational database tables. In this example, two elements from active RTE table 202 are joined with two elements from RTE definition table 214 (i.e., RTE ID 204 is joined with RTE ID 216, and RTE username 206 is joined with RTE username 218).

If query 108 does not reference the currently configured RTE, then web query application 118 determines an unconfigured RTE against which to execute query 108. For example, assume web browser 104 submits a query to run a report against an RTE other than the currently configured one (referred to as an 'unconfigured' RTE). In response, web query application 118 reads active RTE user table 202 and the profile for the user of client computer 102. That is, web query application 118 retrieves RTE ID 204 and RTE username 206. Then, web query application 118 identifies user profiles that match the user from RTE table 208.

If web query application 118 does not find a matching profile, a default profile may be selected, or an error message may be sent to the user. If web query application 118 finds a matching profile in user RTE table 208, web query application 118 proceeds to configure an RTE other than the currently configured RTE as described below.

Web query application 118 searches for profiles in user RTE table 208. Web query application 118 matches an RTE username 206 (i.e., the username of client computer 102) with an RTE username from user RTE table 208. In this case, web query application 118 finds a matching profile by locating RTE username 212 and associated RTE ID 210. RTE ID 210 is the identification of an unconfigured RTE. The RTE definitions for the unconfigured RTE are stored in RTE definition table 214. To change the currently configured RTE (i.e., to configure a new RTE), web query application 118 locates the RTE definitions associated with RTE ID 210 from RTE definition table 114. Server computer 112 then sends the defined runtime associated with RTE ID 210 to client 102. Note, the RTE definitions associated with RTE ID 210 include RTE libraries 222, and RTE libraries 222 are associated with one of the unconfigured RTEs, as shown by the arrows between user RTE table 208 and RTE definition table 114. In one example, the arrows denote joined elements in two relational databases. In this example, the first relational database table is user RTE table 202 and the second relational database table is RTE definition table 214. Furthermore, the elements being joined are RTE ID 210 with RTE ID 216, and RTE username 212 with RTE username 218.

In a further embodiment, web query application 118 also references exit program 124 using the location specified by RTE exit program 224. In addition, web query application 118 also references and exit program libraries 126 using RTE exit program library 226. Next, web query application 118 changes the libraries associated with RTE ID 204 (i.e., the currently configured RTE) with the data libraries associated with RTE ID 210 (i.e., an unconfigured RTE). More specifically, web query application 118 links RTE description 220, RTE libraries 222, and optionally, RTE exit program 224 and RTE exit program libraries 226. Linking, in turn, allows a user to access data from the RTE libraries 222 associated with a previously unconfigured RTE. At this point, RTE configuration is complete. That is, the RTE associated with RTE ID 210 (the unconfigured RTE) is now the currently configured RTE. Finally, web query application 118 then executes query 108 on the data libraries associated with RTE ID 210.

In some cases, the user of client computer 102 selects which RTE to execute a query against. For example, a user may select the RTE using a drop-down menu in web browser 104 and selecting a desired RTE. In this case, the user selects an RTE from web browser 104 and sends a query to server computer 112.

If no matching RTE username is found, a default username may be selected or an error message may be sent to an administrator. If a matching RTE username is found, the runtime definitions associated with the matching RTE username are loaded in the manner described above.

An administrator may manage RTEs with RTE configuration component 116. To add an RTE, the administrator updates user RTE table 208 and RTE definition table 114. The master tables may be modified without ending web query application 118 and without requiring the user to log out of the current RTE or to reload the server with another RTE.

Figure 3A:
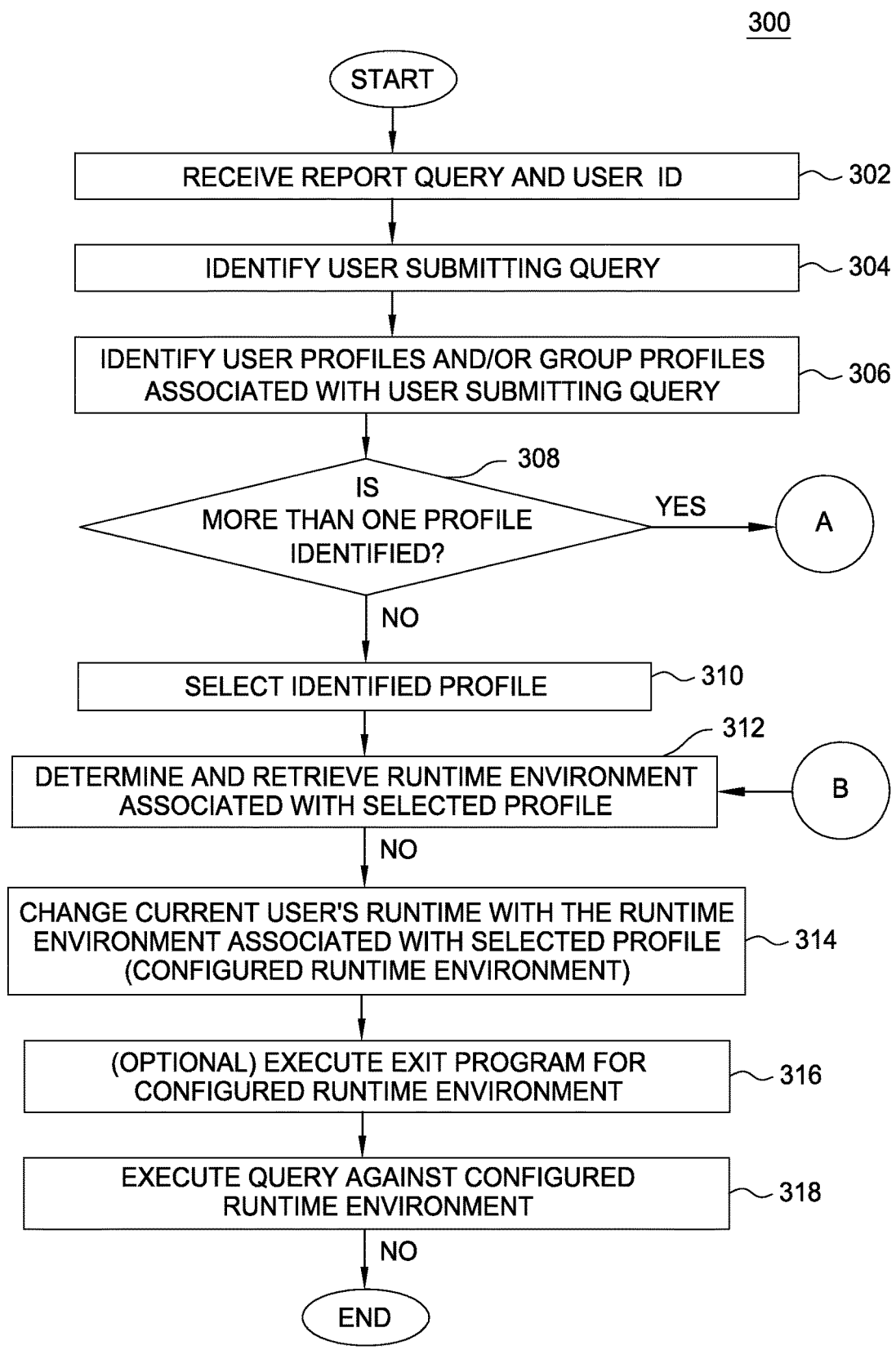
FIGS. 3A and 3B illustrate a method for executing a query that allows a user to switch runtime environments, according to one embodiment of the invention.
Figure 3B:
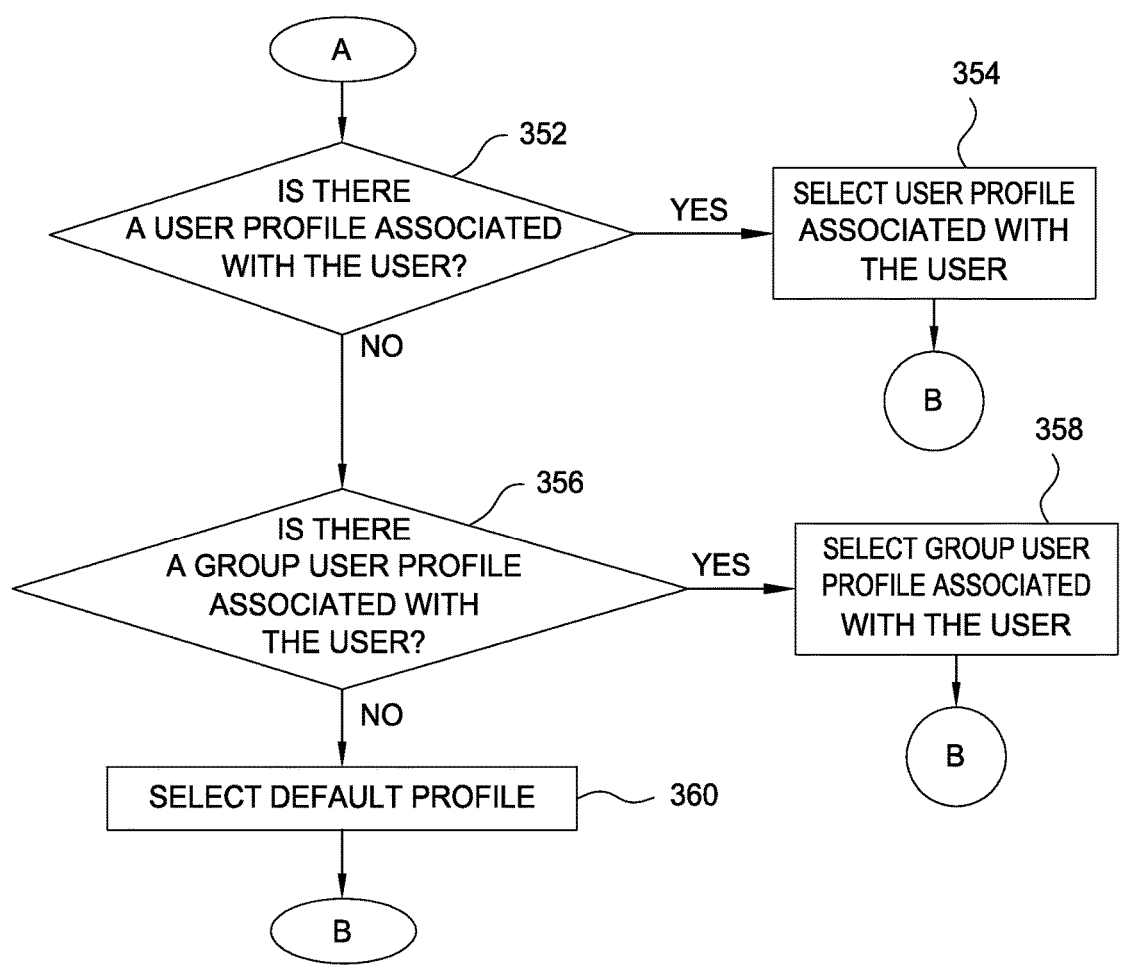

FIGS. 3A and 3B illustrate a method 300 for executing a query that allows a user to switch runtime environments, according to one embodiment of the invention. Although the method steps are described in conjunction with FIG. 1, persons skilled in the art will understand that any system configured to perform the method steps, in any order, falls within the scope of the present invention. The method begins at step 302, where web query application 118 receives a query 108 and a user ID. At step 304, web query application 118 identifies the user based on the user ID. At step 306, web query application 118 identifies user profiles and/or group profiles associated with the user. If more than one profile is identified, the method continues in FIG. 3B with step 352.

Otherwise, at step 312, web query application 118 determines and retrieves an RTE associated with the selected profile. At step 314, web query application 118 changes the libraries associated with RTE 106 to the libraries associated with the configured RTE from libraries 122. Note, if the RTE identified at 312 is currently configured, the system need not reconfigure it. At step 318, web query application 118 executes query 108 against the configured RTE. Optionally, at step 316, web query application 118 executes an exit program for the configured RTE.

FIG. 3B illustrates a method 350 selecting an RTE profile. At step 352, web query application 118 determines whether a specific profile is associated with the user. If so, then, at step 354, web query application 118 selects the specific user profile and the method returns to step 312. If there is no specific user profile associated with the user, then, at step 356, web query application 118 determines whether there is a group profile associated with the user. If so, web query application 118 selects the group profile and the method returns to step 312. If there is no group profile, then, at step 360, web query application 118 selects a default profile and the method returns to step 312. If no default profile is available, then an error-handling routine may be called to display an error to the user of client computer 102 and/or notify the administrator of RTE configuration component 116.

Figure 4:
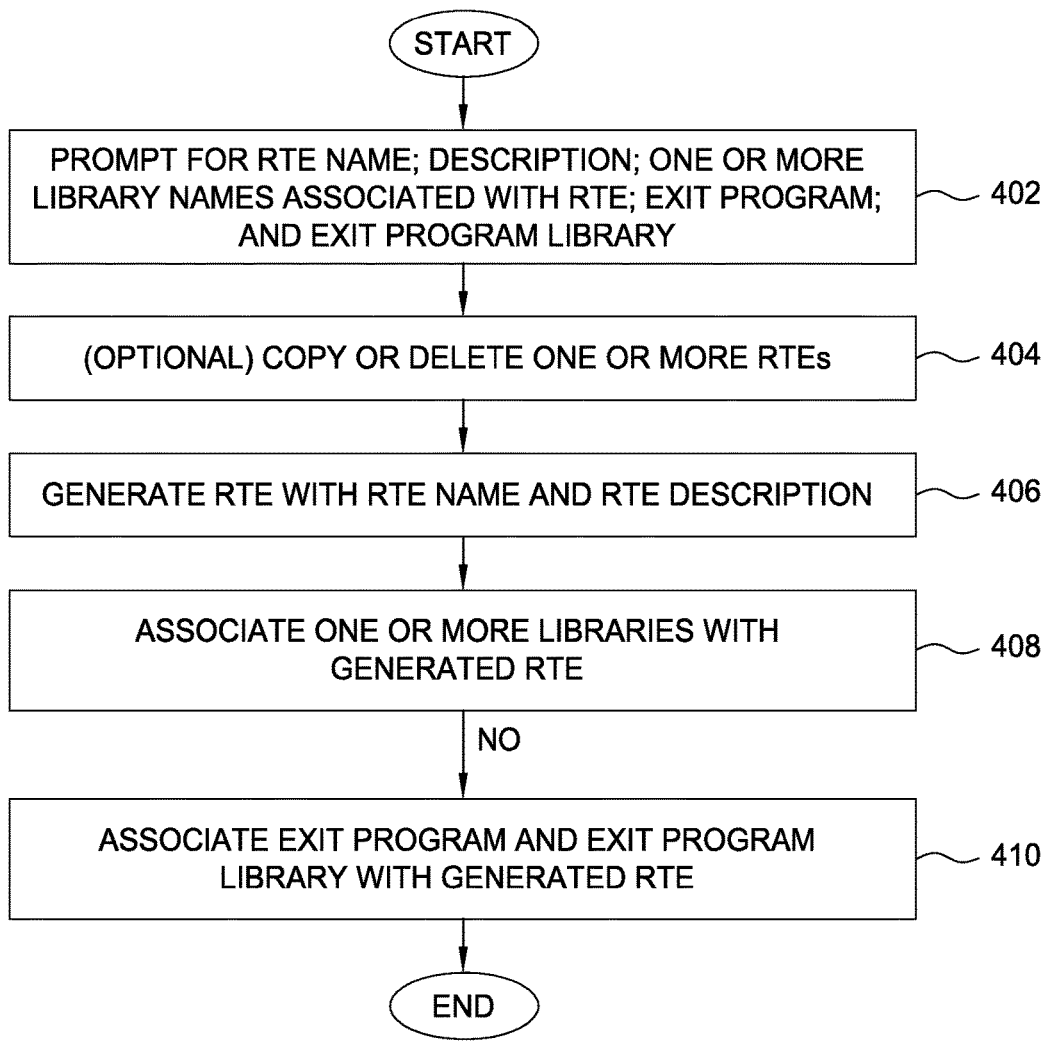
FIG. 4 illustrates a method for managing and editing a runtime environment for the runtime configuration component, according to one embodiment of the invention.

FIG. 4 illustrates a method for adding, removing, changing or copying a runtime environment for runtime configuration component 116, according to one embodiment of the invention. Although the method steps are described in conjunction with FIG. 1, persons skilled in the art will understand that any system configured to perform the method steps, in any order, falls within the scope of the present invention. The method 400 begins at step 402, in which RTE configuration component 116 prompts for an RTE name, RTE description, and RTE libraries. At step 406, RTE configuration component 116 generates an RTE with the RTE name and RTE description from step 402. At step 408, RTE configuration component 116 associates RTE libraries from step 402 with the generated RTE. At step 410, RTE configuration component 116 associates the RTE exit program and the RTE exit program library from step 402 with the generated RTE. Optionally at step 402, RTE configuration component 116 prompts for an RTE exit program and RTE exit program libraries. Optionally, at step 404, RTE configuration component 116 copies or deletes one or more RTEs.

Figure 5:
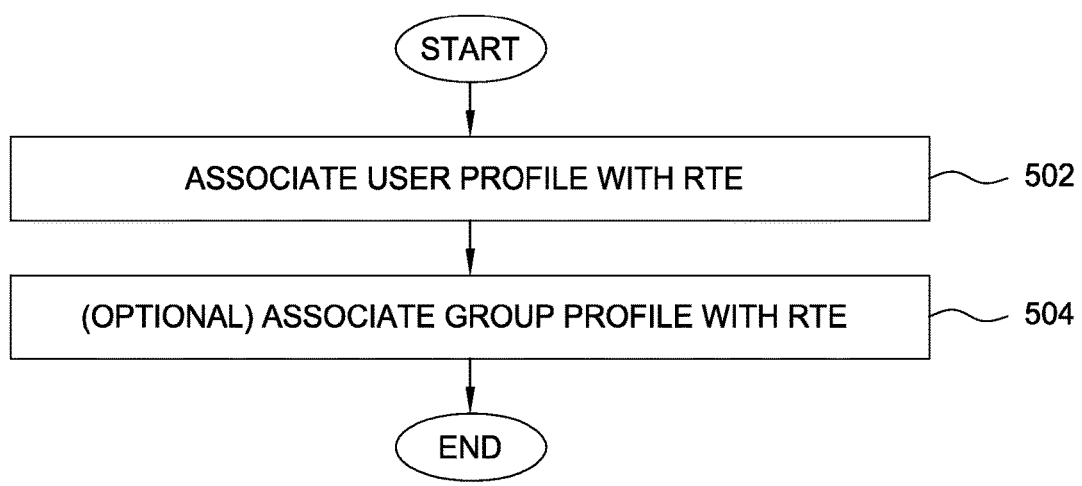
FIG. 5 illustrates a method for associating user profiles and/or group profiles with a runtime environment for the runtime configuration component, according to one embodiment of the invention.

FIG. 5 illustrates a method for associating user profiles and/or group profiles with a runtime environment for the runtime configuration component, according to one embodiment of the invention. Although the method steps are described in conjunction with FIG. 1, persons skilled in the art will understand that any system configured to perform the method steps, in any order, falls within the scope of the present invention. The method 500 begins at step 502, in which RTE configuration component 116 associates a user profile from profiles 120 with an RTE from RTE definitions 114. Optionally, at step 504, RTE configuration component 116 associates a group profile from profiles 120 with an RTE from RTE definitions 114.

FIG. 6 illustrates an example interface showing a generated report of sales data. As shown, interface 600 allows a user to access data against dynamically configured RTEs. In one embodiment, interface 600 is web browser 104. Interface 600 displays sales data from Eastern Canada and the Eastern US. Each region contains a sample store (i.e., store "ABC" and store "XYZ"), and the sales numbers associated with these sample stores over the course of two years. Using the sales example described earlier, a user of client computer 102 can execute queries on multiple RTEs, wherein each RTE is associated with a different country in North America. Thus, the user can run reports against isolated RTEs for Canada, Mexico and the US without logging in and out as a different user, or having to reload computer server 112 with different data (e.g., reloading computer server with a different set of data libraries for libraries 122. As shown in FIG. 6, data for Store ABC, located in Eastern Canada, populates the 'Year 1' and 'Year 2' columns. In the same window, data for Store XYZ, located in the Eastern US, populates the same columns, allowing a side-by-side comparison of data from two isolated RTEs.

Figure 7:
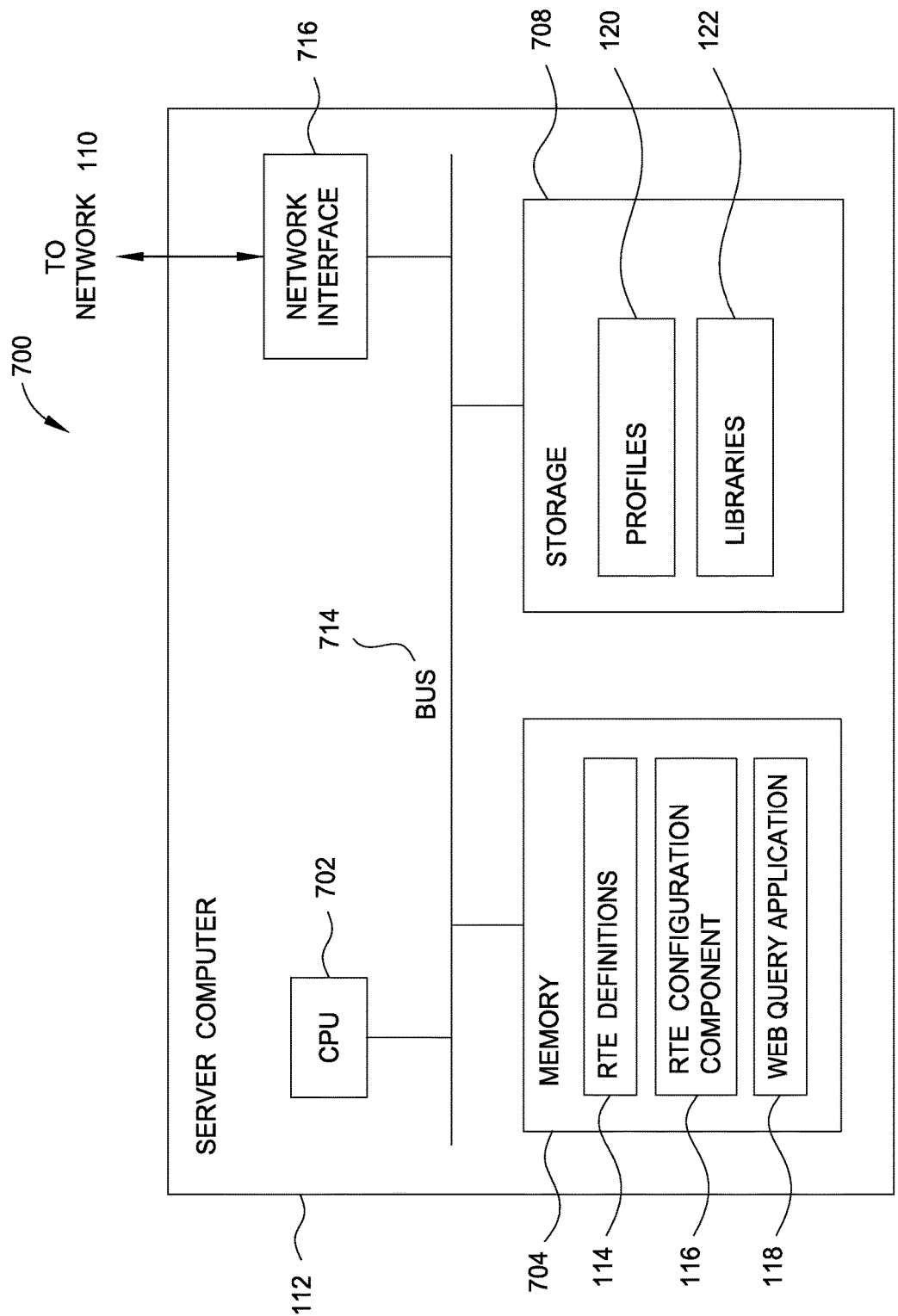
FIG. 7 illustrates an example computing system configured to execute queries and manage profiles.

FIG. 7 illustrates an example computing system 700 configured to execute queries and manage profiles. As shown, the computing system 700 includes, without limitation, a central processing unit (CPU) 702, a memory 704, a bus 714, storage 708, and network interface 716. Further, in the context of this disclosure, the computing elements in computing system 700 may correspond to a physical computing system (e.g., a system in a data center) or may be a virtual computing instance executing within a computing cloud.

The CPU 702 retrieves and executes programming instructions stored in memory 704 as well as stores and retrieves application data residing in memory 704. The bus 714 is used to transmit programming instructions and application data between CPU 702, memory 704, storage 708 and network interface 716. Note, CPU 702 is included to be representative of a single CPU, multiple CPUs, a single CPU having multiple cores, and the like. Furthermore, memory 704 is generally included to be representative of a random access memory. Storage 708 may be a disk drive storage device or solid state storage device. Although shown as a single unit, storage 708 may be a combination of fixed and/or removable storage devices, such as fixed disc drives, removable memory cards, or optical storage, network attached storage (NAS), or a storage area-network (SAN). Storage 708 stores profiles 120 and libraries 122.

Illustratively, memory 704 includes RTE configuration component 116, web query application 118, and RTE definitions 114. RTE configuration component 116 allows an administrator to manage user profiles 120. Web query application 118 executes queries (such as query 108) submitted by the user of client computer 102. RTE definitions 114 stores the locations of data (such as data found in libraries 122) associated with RTEs (such as RTE 106).

Web query application 118 executes queries against multiple RTEs and return data from libraries 122 to client computer 102. Thus, client computer 102 may display data from multiple, isolated RTEs without requiring the user to log in and out as a different user, or restart and/or reload server computer 112. For example, client computer 102 may run web browser 104. Web browser 104 may contain RTE 106, which is associated with US sales data, as illustrated in FIG. 6. The user of client computer 102 may send query 108 in order to run a report on Canadian sales data. Web query application 118 executes the query and returns the requested data from libraries 122 data to client computer 102. Thus, the data fields in web browser 104 are populated with data from the library associated with the Canadian sales data RTE, as shown in FIG. 6. In this manner, web query application 118 allows client computer 102 to display data from two separate RTEs simultaneously.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a cloud-based web query application in order to submit queries against multiple RTEs, which can also be stored in the cloud. For example, a client computer could send queries which are then executed by a web query application on a computing system in the cloud. Further, the web query application could retrieve data from libraries stored in the cloud computing system. Doing so allows the data retrieved to be displayed in an RTE on the client computer.

As described, embodiments presented herein provide techniques for allowing users to access multiple RTEs from a web browser hosted by a client device. Advantageously, this approach allows for a user to access isolated data libraries from multiple RTEs without logging out and logging back in as a different user, restarting or reloading a computer server, or creating new virtual machines to host isolated data libraries.

Additional embodiments presented herein provide techniques for allowing administrators to manage and edit RTEs, as well as allowing administrators to associate users with RTEs. Advantageously, this approach allows for administrators to manage and edit RTEs as well as modify user access to RTEs while RTEs are currently running (i.e., without shutting down the server configured to run RTEs).

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium storing instructions, which, when executed on a processor, performs an operation for returning data to a user, the operation comprising:
   receiving, by a server computing system, a query;
   determining a runtime environment (RTE) to execute the query against; wherein the determined RTE identifies one or more data libraries;
   determining whether a current RTE for executing queries on the server computing system matches the determined RTE;
   upon determining that the current RTE does not match the determined RTE, configuring the current RTE server computing system to access the data libraries associated with the determined RTE; and
   executing the query.

2. The computer-readable storage medium of claim 1, wherein the determined RTE is determined from a user profile associated with a user submitting the query.

3. The computer-readable storage medium of claim 1, wherein the determined RTE is determined from a group profile associated with a user submitting the query.

4. The computer-readable storage medium of claim 1, wherein the determined RTE is determined as a default RTE.

5. The computer-readable storage medium of claim 1, wherein the query identifies a user selection of an RTE for executing the query.

6. The computer-readable storage medium of claim 1, wherein the RTE identifies one or more exit programs to execute along with the execution of the query.

7. The computer-readable storage medium of claim 1, wherein the determined RTE is one of a plurality of RTEs configurable on the server computing system, and wherein each RTE is associated with a distinct collection of data libraries storing data according to a common schema.

8. The computer-readable storage medium of claim 1, wherein the operation further comprises:
   generating a report from data returned by executing the query; and
   transmitting the report to a client computing system which submitted the query for execution.

9. A system, comprising:
   a processor; and
   a memory hosting an application, which, when executed on the processor, performs an operation for returning data to a user, the operation comprising:
   receiving, by a server computing system, a query;
   determining a runtime environment (RTE) to execute the query against, wherein the determined RTE identifies one or more data libraries;
   determining whether a current RTE for executing queries on the server computing system matches the determined RTE;
   upon determining that the current RTE does not match the determined RTE, configuring the current RTE server computing system to access the data libraries associated with the determined RTE; and
   executing the query.

10. The system of claim 9, wherein the determined RTE is determined from a user profile associated with a user submitting the query.

11. The system of claim 9, wherein the determined RTE is determined from a user profile associated with a user submitting the query.

12. The system of claim 9, wherein the determined RTE is one of a plurality of RTEs configurable on the server computing system, and wherein each RTE is associated with a distinct collection of data libraries storing data according to a common schema.

* * * * *